UNITED STATES PATENT OFFICE.

ADAM COOK, OF ALBANY, AND PETER PULVER, OF NEWTOWN, NEW YORK.

IMPROVEMENT IN LUBRICATING COMPOUNDS.

Specification forming part of Letters Patent No. 149,996, dated April 21, 1874; application filed March 24, 1874.

*To all whom it may concern:*

Be it known that we, ADAM COOK, of Albany, in the county of Albany and State of New York, and PETER PULVER, of Newtown, in the county of Queens and said State of New York, have invented a new and Improved Lubricating Compound; and we do hereby declare the following to be a full, clear, and exact description thereof, which will enable those skilled in the art to make and use the same.

This invention relates to a compound made of fatty matter, lye, and gelatine, to which may be added Burgundy pitch, gum - tragacanth, and gum-arabic, in such a manner that a compound is produced which remains "set" at the ordinary temperature, and which will not become fluid unless it is exposed to a temperature of over 110°.

In carrying out our invention, we take fatty matter, by preference, as follows: Tallow, one hundred pounds; lard, twenty pounds; oil, fifty pounds; to which is added lye of 13° to 15° Baumé, twenty pounds; and gelatine, two pounds. We also add Burgundy pitch, one pound; gum - tragacanth, one - fourth pound; gum-arabic, one - fourth pound; and curriers' table-grease, ten pounds.

In preparing our compound, we take all the fatty matters and melt them together in a suitable kettle; then we add to this the Burgundy pitch in a melted state. The gelatine and gums are dissolved in water, and then added, together with the lye, to the mixture of Burgundy pitch and fatty matters while the latter is still warm, the whole being stirred together until all the ingredients are intimately mixed.

The substance designated as "curriers' table-grease" is the refuse obtained in curriers' shops, and consists of fatty matter mixed with tannin taken up by said fatty matter from the leather with which the same has been brought in contact.

By mixing these ingredients together as above specified, a compound is obtained which begins to melt at a temperature of about 110°.

What we claim as new, and desire to secure by Letters Patent, is—

A lubricating compound composed of fatty matter, lye, and gelatine, either with or without a resin product or gum or gums, substantially as described, for the purpose set forth.

This specification signed by us this 8th day of October, 1873.

ADAM COOK.
      PETER PULVER.

Witnesses:
 W. HAUFF,
 CHAS. WAHLERS.